Patented Sept. 29, 1953

2,653,923

UNITED STATES PATENT OFFICE 2,653,923

METHOD FOR PREPARATION OF A POLYVINYL METHYL ETHER

Joseph F. Shekleton, Easton, Pa., assignor to General Aniline & Film Corporation, New York, N. Y., a corporation of Delaware No Drawing. Application November 13, 1948, Serial No. 59,971

5 Claims. (Cl. 260—91.1)

This invention relates to the production of a polyvinyl methyl ether of unusual physical properties.

Polymerization of vinyl ethers, among them vinyl methyl ether, by means of ionic acid-reacting catalysts is known. The polymerization, however, is usually accomplished at a temperature above about −10° C. or in a diluent such as propane. The diluent may be accompanied by an activating agent such as methylene chloride or chloroform or any chlorinated hydrocarbon containing hydrogen. Ordinarily the products of these processes are liquid, semi-solid adhesive polymers.

I have found that by carrying out the polymerization of vinyl methyl ether in the presence of an acid-reacting ionic catalyst in the bulk (i. e., substantially free of diluent) at temperatures maintained below −50° C. there is obtained a non-sticky, somewhat rubbery, form-stable white solid curd of polyvinyl methyl ether.

The following example illustrates a preferable means of carrying out this invention, but it is understood that I am not limited thereto and various modifications and alterations may be made within the scope of the appended claims.

EXAMPLE 392 parts by volume of methyl vinyl ether was chilled in a Dry-Ice bath to −63° C. A 10% solution of boron fluoride-ethyl ether complex in ethyl ether was added in the amounts and at the times indicated in the table below. Dry Ice was also added as indicated in the table in an attempt to maintain the temperature constant.

Table

| T., °C. | Time | Catalyst | T., °C. | Time | Catalyst |
|---|---|---|---|---|---|
| | Min. | Parts | | Min. | |
| −63 | 0 | | −63 | 82 | |
| −65 | 21 | | −63 | 83 | |
| −64 | 32 | | −62.5 | 87 | |
| −63 | 35 | 10 | −62 | 90 | |
| −65 | 41 | 10 | −61 | 91 | Add Dry Ice. |
| −63.5 | 42 | | −65 | 92 | |
| −64.5 | 45 | | −66.5 | 93 | |
| −65 | 46 | 6 | −67 | 95 | |
| −64 | 47 | | −64 | 98 | |
| −64.5 | 49 | 4 | −61 | 100 | Do. |
| −64 | 53 | 2 | −61 | 101 | |
| −64 | 55 | 2 | −61 | 102 | Do. |
| −64 | 57 | 2 | −64 | 103 | |
| −64 | 60 | 2 | −60 | 111 | Do. |
| −64 | 64 | 1 | −63 | 112 | |
| −64 | 66 | 1 | −60 | 116 | Do. |
| −64 | 70 | 1 | −63 | 117 | |
| −64 | 73 | 1 | −64 | 133 | Do. |
| −63.5 | 81 | | −58 | 134 | Stop reaction. |

The polymerization was stopped by the addition of about 250 parts of concentrated ammonium hydroxide containing Dry Ice. The entire mixture was stirred during the reaction and after the addition of ammonium hydroxide.

The mass gradually turned into curd-like solid pieces somewhat rubbery and tough but not sticky. Among the white curds were some colored particles which were separated by hand. The white particles were dissolved in one volume of ethanol, and by the addition of four volumes of hot water the polymer came out of solution and was dried over $P_2O_5$ in a vacuum desiccator. The product weighed 147 parts as compared with the 290 parts by weight of the original methyl vinyl ether. The viscosity K-value (1% solution in benzene) was 32. (Method of H. Fikentscher, Cellulosechemie XIII 58, 1932.)

While temperatures in the range −60° to −65° C. have been used in the above example and are preferable, temperatures generally below −50° C. as for example −50 to −70° C. may be used. The temperature should be maintained within these limits to prevent formation of the usual sticky polymer. Any suitable means of refrigerating may be employed for cooling the reaction, as for example, adding solid carbon dioxide periodically or circulating the liquid refrigerant through the reaction or a combination of these means may be employed.

While commercially obtainable methyl vinyl ether may be used as supplied, it is preferable to dry it until it is substantially free of moisture. Furthermore, known stabilizers for vinyl ether polymers may be used during the polymerization. Also, it is important to note that substantially no polymerizations were initiated until about 4 parts by volume of the catalyst had been added (about 40 parts of volume of the 10% solution of catalyst). This amount of catalyst is equal to about 1% by weight or volume of the methyl vinyl ether. The reaction is allowed to continue until the viscous liquid becomes a solid curd.

While boron fluoride-ethyl ether complex is the preferred catalyst, other ionic acid-reacting catalysts usually used for vinyl ether polymerization may be used, such as boron fluoride, gallium trichloride, sulfur dioxide, aluminum chloride, etc. The boron fluoride-ethyl ether complex is preferably diluted with a solvent of the same or another ether.

The process of the present invention, besides producing the novel product, has at least these advantages over conventional vinyl methyl ether polymerization processes. There is no need to cool any diluent. There is no danger from inflammable diluents such as propane. There is no problem of removing diluent from the product.

The product is quite distinct from the usual liquid or semi-solid sticky polymer. It is a somewhat rubbery, form-stable, non-sticky, curd-like white solid. It is soluble in cold water, alcohols and benzene. A relatively non-sticky transparent film may be cast from an alcohol solution of the polymer.

What I claim is:

1. A process for producing a somewhat rubbery form-stable, non-sticky, curd-like polyvinyl methyl ether which comprises polymerizing vinyl methyl ether at a temperature from about —50° C. to about —70° C. in the presence of about 1%, based on the weight of the vinyl methyl ether, of a catalyst therefor and up to 9 parts by volume of diluent per part of said catalyst.

2. A process of claim 1 wherein the vinyl methyl ether is substantially moisture-free.

3. A process of claim 1 wherein the catalyst is an ionic acid-reacting material.

4. The process of claim 1 wherein the catalyst is a boron fluoride-ethyl ether complex.

5. A process of claim 4 wherein the temperature is in the range of —60° C. to —65° C.

JOSEPH F. SHEKLETON.

References Cited in the file of this patent

UNITED STATES PATENTS

| Number | Name | Date |
|---|---|---|
| 2,061,934 | Mueller-Cunradi et al. | Nov. 24, 1936 |
| 2,104,001 | Reppe et al. | Dec. 28, 1937 |
| 2,379,656 | Ruthruff | July 3, 1945 |
| 2,513,820 | Schildknecht | July 4, 1950 |

FOREIGN PATENTS

| Number | Country | Date |
|---|---|---|
| 513,521 | Great Britain | Oct. 16, 1939 |